United States Patent
Grujo et al.

(10) Patent No.: US 11,976,762 B2
(45) Date of Patent: May 7, 2024

(54) QUICK CONNECTOR ASSEMBLY WITH QR VERIFICATION ARRANGEMENT AND METHOD

(71) Applicant: Novares US Engine Components, Inc., Walworth, WI (US)

(72) Inventors: Stefan Grujo, Walworth, WI (US); Chad Dickman, Walworth, WI (US); Matt Murphy, Walworth, WI (US)

(73) Assignee: Novares US Engine Components, Inc., Walworth, WI (US)

( * ) Notice: Subject to any disclaimer, the term of this patent is extended or adjusted under 35 U.S.C. 154(b) by 78 days.

(21) Appl. No.: 17/831,269

(22) Filed: Jun. 2, 2022

(65) Prior Publication Data

US 2023/0392735 A1    Dec. 7, 2023

(51) Int. Cl.
*F16L 37/107*  (2006.01)
*F16L 37/14*  (2006.01)

(52) U.S. Cl.
CPC .......... *F16L 37/107* (2013.01); *F16L 37/144* (2013.01); *F16L 2201/10* (2013.01)

(58) Field of Classification Search
CPC ... F16L 2201/10; F16L 37/144; F16L 37/107; F16L 37/088
USPC .......................................................... 285/93
See application file for complete search history.

(56) References Cited

U.S. PATENT DOCUMENTS

| | | | |
|---|---|---|---|
| 11,320,076 B2 | 5/2022 | Rohde et al. | |
| 2020/0309298 A1* | 10/2020 | Kuhn | F16L 37/084 |
| 2020/0355308 A1* | 11/2020 | Hunt | F16L 37/144 |
| 2021/0364112 A1* | 11/2021 | Barthel | F16L 37/0885 |
| 2021/0396336 A1 | 12/2021 | Schorter | |
| 2022/0003347 A1 | 1/2022 | Barthel et al. | |
| 2022/0163153 A1 | 5/2022 | Gauthier | |
| 2022/0299141 A1 | 9/2022 | Choo et al. | |
| 2022/0299143 A1 | 9/2022 | Gabbey et al. | |

FOREIGN PATENT DOCUMENTS

| | | |
|---|---|---|
| DE | 102018219440 A1 | 5/2020 |
| DE | 202020103903 U1 | 7/2020 |
| WO | 2022106884 A1 | 5/2022 |

* cited by examiner

*Primary Examiner* — David Bochna
(74) *Attorney, Agent, or Firm* — Dickinson Wright PLLC

(57) ABSTRACT

A connector assembly and method of making a fluid-tight connection therewith is provided. The assembly includes a housing having a tubular wall bounding a bore extending between opposite first and second ends. The bore has first and second diameter portions with a shoulder extending radially therebetween. A covered portion of a channel extends from the housing second end toward the housing first end to an uncovered portion of the channel. A retainer is disposed in the bore. An indicator body, received in the channel, extends from the retainer outwardly to an indicator surface. A male connector has a tubular wall moveable in the bore between decoupled and coupled positions. A protrusion extends outwardly from the male connector tubular wall. The indicator surface is partially concealed within the covered portion of the channel when the male connector is in the decoupled position. The protrusion compresses the indicator body when the male connector moves to the coupled position, whereupon the indicator surface is moved entirely into the uncovered portion of the channel.

20 Claims, 10 Drawing Sheets

QUICK CONNECTOR ASSEMBLY WITH QR VERIFICATION ARRANGEMENT AND METHOD

BACKGROUND OF THE INVENTION

1. Field of the Invention

The present disclosure relates generally to a quick connector assembly for establishing a fluid-tight union between fluid conduits, and more particularly to a quick connector assembly having a verification mechanism for assuring an insertion member is properly secured within a receiving member to convey fluids therethrough.

2. Related Art

This section provides background information related to the present disclosure which is not acknowledged as being prior art.

As is well known, a type of coupling assembly, commonly referred to as a "quick connector," is used to quickly and simply connect tubes, also referred to as conduits, to one another to establish a leak-proof connection for reliable flow of fluid or gas therethrough. Quick connector assemblies connect an insertion member to a receiving member to convey fluids therethrough in a variety of liquid and gas systems to provide a connection between a pair of components for establishing a continuous flow path therebetween. For example, in automotive applications, quick connectors are used in various air/vapor management systems such as evaporative emissions systems, crankcase ventilation systems, and brake boost and engine vacuum systems. In addition to these gas management systems, quick connectors can also be used in fluid delivery systems such as, for example, liquid fuel and windshield washer applications. The benefits of quick connectors in automotive applications include their intended ease of assembly and subsequent replacement, a reduction in the number of leak paths, a reduction in the number of system components, and the containment of hydrocarbon emissions.

Despite the increasing opportunity to use quick connectors in motor vehicle gas management and liquid delivery systems, a need still exists to provide a superior, reliable mounting between one of the male and female connector components, typically the male port connector, and its adjoining wall structure. A further need exists to ensure the connection is made as intended, to avoid an unwanted leaking between the connected members after assembly and while in use. Ideally, this would be accomplished by providing a mounting arrangement that is quick to assemble and reduces fabrication complexity and permits modular connection of a wide variety of connectors.

SUMMARY

This section provides a general summary of the disclosure and is not intended to represent a comprehensive summary of all of its features, advantages, aspect and/or objectives.

It is an aspect of the present disclosure to provide a quick and reliable verification mechanism and method in which to ensure a reliable, fluid-tight seal has been established between a plurality of components of a quick connector used to form a fluid-tight connection between conduits. The verification mechanism and method include providing detectable evidence that such a reliable, fluid-tight connection has been made, thereby facilitating the ability to inspect the fluid-tight connection has been established, regardless of the type of environment encountered the assembly facility.

A connector assembly for establishing a fluid-tight connection between fluid conduits is provided. The assembly, in accordance with an aspect of the disclosure, includes: a housing having a tubular housing wall with a housing inner surface bounding a housing bore extending along a central longitudinal axis between a first housing end and an opposite second housing end. The housing has a channel extending axially from the second housing end toward the first housing end, wherein the channel has a covered first portion enclosed by a shroud adjacent the second housing end and an uncovered second portion extending from the covered first portion toward the first housing end. A retainer is provided having an annular retainer wall sized for receipt in the housing bore. An indicator body extends radially outwardly from the annular retainer wall to an indicator surface. The indicator body is sized for translation in the channel. A male connector is provided having a tubular connector wall configured for insertion into the bore of the housing along the central axis from a decoupled position to a coupled position. A protrusion extends radially outwardly from a connector outer surface of the tubular connector wall for engagement with the indicator body. The indicator surface remains partially concealed by the shroud within the covered first portion of the channel when the male connector is in the decoupled position, thereby not being fully viewable in the uncovered second portion of the channel and indicating the male connector is in the decoupled position. The protrusion engages and compresses the indicator body when the male connector is in the coupled position, whereupon the indicator surface is moved axially outwardly from the covered first portion of the channel such that the indicator surface is fully viewable in the uncovered second portion of the channel, thereby indicating the male connector is in the coupled position. As such, visual and/or viewable, detectable evidence is provided indicating the male connector is properly and completely assembled in a fluid-tight fashion with the housing.

In accordance with another aspect of the disclosure, the housing inner surface has a first diameter portion and a second diameter portion with an annular lower shoulder extending between the first diameter portion and the second diameter portion, with an annular seal being disposed between the retainer and the annular lower shoulder, wherein the retainer retains the annular seal between the first diameter portion and the lower shoulder.

In accordance with another aspect of the disclosure, the housing inner surface can be provided having a third diameter portion with an annular upper shoulder extending radially outwardly from the third diameter portion to the first diameter portion, with the retainer being received in the first diameter portion and retaining the seal in the third diameter portion.

In accordance with another aspect of the disclosure, the annular retainer wall has a retainer inner surface that extends axially along the central axis between a first retainer end and an opposite second retainer end, with the first retainer end abutting the annular upper shoulder to prevent movement of the retainer along the central axis when the protrusion compresses the indicator body.

In accordance with another aspect of the disclosure, the retainer inner surface has a generally cylindrical portion extending from the first retainer end toward the second retainer end to a tapered portion diverging radially outwardly from the generally cylindrical portion, wherein the connector outer surface has a tapered connector surface configured to abut the tapered portion when the male connector is in the coupled position.

In accordance with another aspect of the disclosure, the protrusion extends radially outwardly of the tapered connector surface for sliding receipt in a through passage extending radially outwardly from the housing bore to the channel.

In accordance with another aspect of the disclosure, the housing inner surface has an alignment channel extending axially from the second housing end toward the annular second shoulder, wherein the male connector has an alignment member extending radially outwardly from the connector outer surface for receipt in the alignment channel.

In accordance with another aspect of the disclosure, the alignment member can be provided diametrically opposite the protrusion.

In accordance with another aspect of the disclosure, the annular retainer wall extends axially along the central axis between a first retainer end and an opposite second retainer end, wherein a slot extends circumferentially through the annular retainer wall between the first retainer end and the second retainer end to form a first sector extending from the slot to the first retainer end and a second sector extending from the slot to the second retainer end, with the indicator body extending radially outward from the second sector.

In accordance with another aspect of the disclosure, the slot has a first width extending between the first sector and the second sector when the male connector is in the decoupled position, and the slot has a second width extending between the first sector and the second sector when the male connector is in the coupled position, wherein the second width is less than the first width.

In accordance with another aspect of the disclosure, the indicator surface extends into the covered first portion of the channel a first distance when the male connector is in the decoupled position, wherein the first distance can be provided being substantially equal to the first width of the slot, such that when the slot is substantially reduced in width during assembly, the indicator surface is moved completely outward from the covered first portion of the channel for full viewing by a detection mechanism, wherein the detection mechanism can be visual, electronic, or otherwise.

In accordance with another aspect of the disclosure, the annular retainer wall can be formed of an elastomeric, polymeric material.

In accordance with another aspect of the disclosure, a lock member can be supported by the housing, with the lock member being configured to releasably maintain the male connector in the coupled position.

In accordance with another aspect of the disclosure, the housing can be provided having a lock slot extending though through the tubular housing wall, wherein the lock member extends through the lock slot into the bore for engagement with the male connector to releasably maintain the male connector in the coupled position.

In accordance with another aspect of the disclosure, the lock member can be provided as a spring clip configured to extend about a portion of the tubular housing wall.

It is another aspect of the present disclosure to provide a method of making and ensuring a reliable, fluid-tight connection between components of a connector assembly for coupling fluid conduits. The method includes: providing a housing having a tubular housing wall with a housing inner surface bounding a housing bore extending along a central longitudinal axis between a first housing end, configured for attachment to one of the fluid conduits, and an opposite second housing end. Further, providing the housing inner surface having a channel extending axially from the second housing end toward the first housing end, wherein the channel has a covered first portion enclosed by a shroud adjacent the second housing end and an uncovered second portion extending from the covered first portion toward the first housing end. Further, disposing a retainer having an annular retainer wall in the housing bore. Providing an indicator body extending radially outwardly from the annular retainer wall to an indicator surface, with at least a portion of the indicator surface being covered by the shroud and concealed within the covered first portion of the channel, such that the concealed portion of the indicator surface is not viewable from outside the housing. Providing a male connector having a tubular connector wall with a protrusion extending radially outwardly from a connector outer surface of the tubular connector wall. Further, inserting the male connector into the housing bore along the central axis and bringing the protrusion into engagement with the indicator body, and continuing insertion of the male connector along the central axis until the male connector reaches a coupled position with the housing. When in the coupled position, the protrusion is in compressing engagement with the indicator body, thereby causing the portion of the indicator surface initially concealed within the covered first portion of the channel to be moved axially outwardly from the covered first portion of the channel into the uncovered second portion of the channel, such that the entirety of the indicator surface is viewable in the uncovered second portion of the channel from outside the housing. Accordingly, the viewable indicator surface provides a viewable and/or detectable indication that the male connector is in the coupled position, whereat a reliable fluid/gas tight seal is provided between the male connector and the housing.

In accordance with another aspect of the invention, the method can further include bringing a lock member, supported by the housing, into releasably locked engagement with the male connector when the male connector reaches the coupled position.

In accordance with another aspect of the invention, the method can further include providing the annular retainer wall extending axially along the central axis between a first retainer end and an opposite second retainer end. Further, providing a weakened region in the annular retainer wall between the first retainer end and the second retainer end, with the indicator body extending radially outward from the weakened region. Providing the weakened region having a first width extending between the first and second retainer ends when the male connector is in a decoupled position, such that the weakened region is caused to be compressed to a second width extending between the first and second retainer ends when the male connector is inserted to the coupled position, with the second width being less than the first width, wherein the reduction of the first width to the second width is sufficient and commensurate with moving the initially concealed portion of the indicator surface outwardly from the covered first portion of the channel into the uncovered second portion of the channel.

In accordance with another aspect of the invention, the method can further include providing the retainer inner surface having a generally cylindrical portion extending from the first retainer end toward the second retainer end to a tapered portion diverging radially outwardly from the generally cylindrical portion. Further, providing the connector outer surface having a cylindrical connector surface extending to a tapered connector surface, such that bringing the protrusion into engagement with the indicator body causes the weakened region to be at least partially compressed toward the second width. Then after the weakened region is at least partially compressed, the tapered connector surface is brought into sealed engagement with the tapered portion of the retainer inner surface when the male connector is moved to the coupled position.

In accordance with another aspect of the invention, the method can further include providing an annular seal between the retainer and the annular first shoulder, and causing the cylindrical connector surface to be brought into sealed engagement with the annular seal upon moving the male connector to the coupled position.

Further areas of applicability of the present invention will become apparent from the description and illustrations provided herein. The description and specific examples in this summary are intended for purposes of illustration only and are not intended to limit the scope of the present disclosure.

BRIEF DESCRIPTION OF THE DRAWINGS

These and other aspects, features and advantages of the invention will become more readily appreciated when considered in connection with the following detailed description, appended claims and accompanying drawings, in which:

DETAILED DESCRIPTION OF PRESENTLY PREFERRED EMBODIMENTS

Referring in general to all of the figures, the present disclosure and teachings described herein are directed to quick connector assemblies, of the type particularly well-suited for providing a fluid and/or gas tight union between conduits. While disclosed in accordance with one or more specific exemplary constructions, a quick connector assembly (QC assembly), also referred to as connector assembly 10, of the present disclosure may be configured other than as expressly shown and described. The inventive concepts disclosed are generally directed to an improved mechanism for forming and readily ensuring, via an improved detection mechanism, a reliable, fluid-tight and/or gas-tight connection is made between a male insertion member, also referred to as male connector 12, and a receiving member, also referred to as female connector or housing 14. The improved detection mechanism is provided, at least in part, via an intermediate retainer, also referred to as retaining member or retainer 16 working in combination with the housing 14. The disclosure is further directed to a method of forming and ensuring a reliable, fluid-tight and/or gas-tight connection is made between the male connector 12 and the housing 14 of the connector assembly 10. The connector assembly 10 and method of making and ensuring a reliable, fluid-tight connection between components, including the housing 14 and retainer 16, is economical in manufacture and provides a quick, reliable way in which to detect a fluid-tight and/or gas-tight connection is established between the male connector 12 and the housing 14.

Figure 2A:
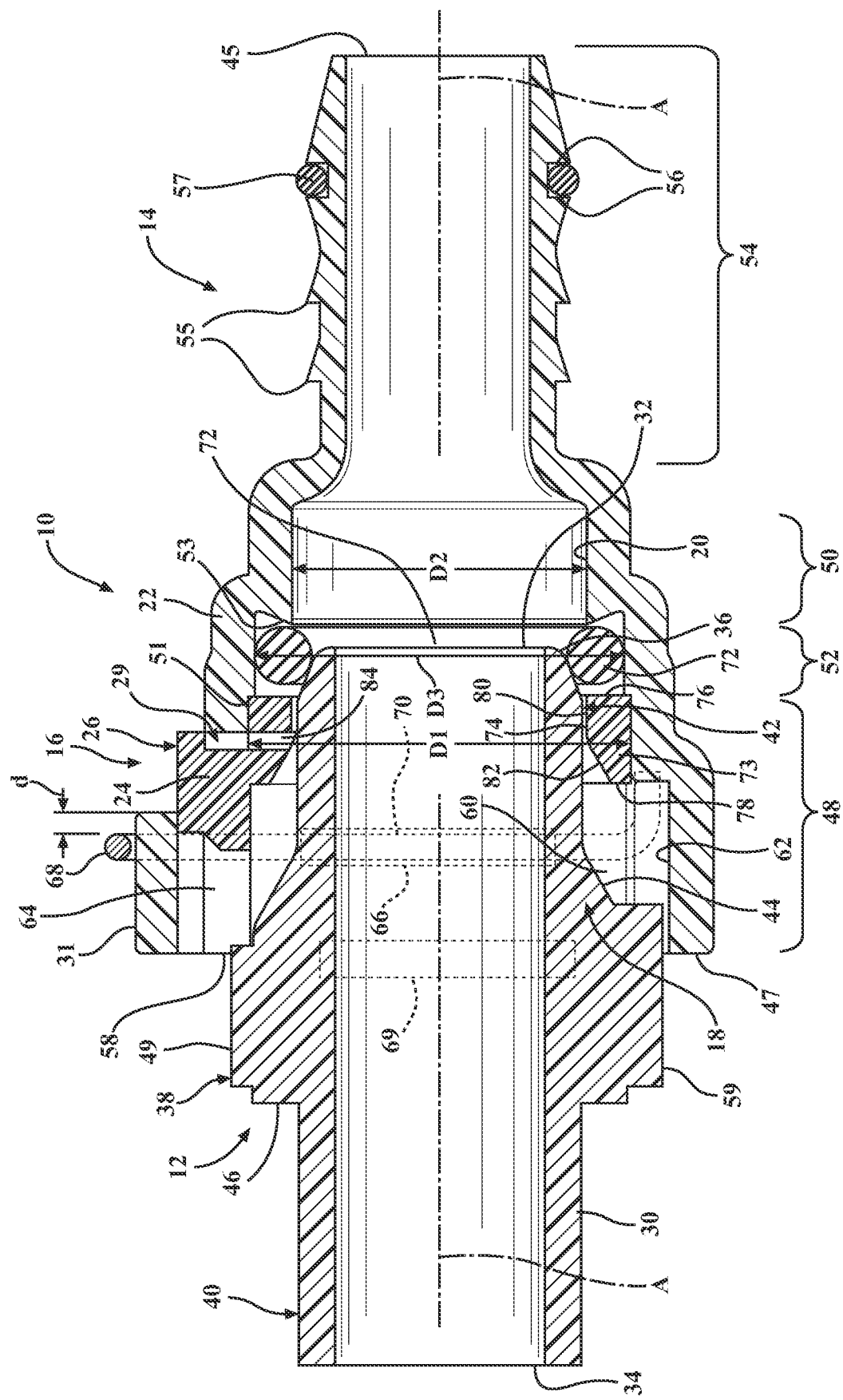
FIG. 2A is a cross-sectional view taken generally along the line 2A-2A of FIG. 1.
Figure 2B:
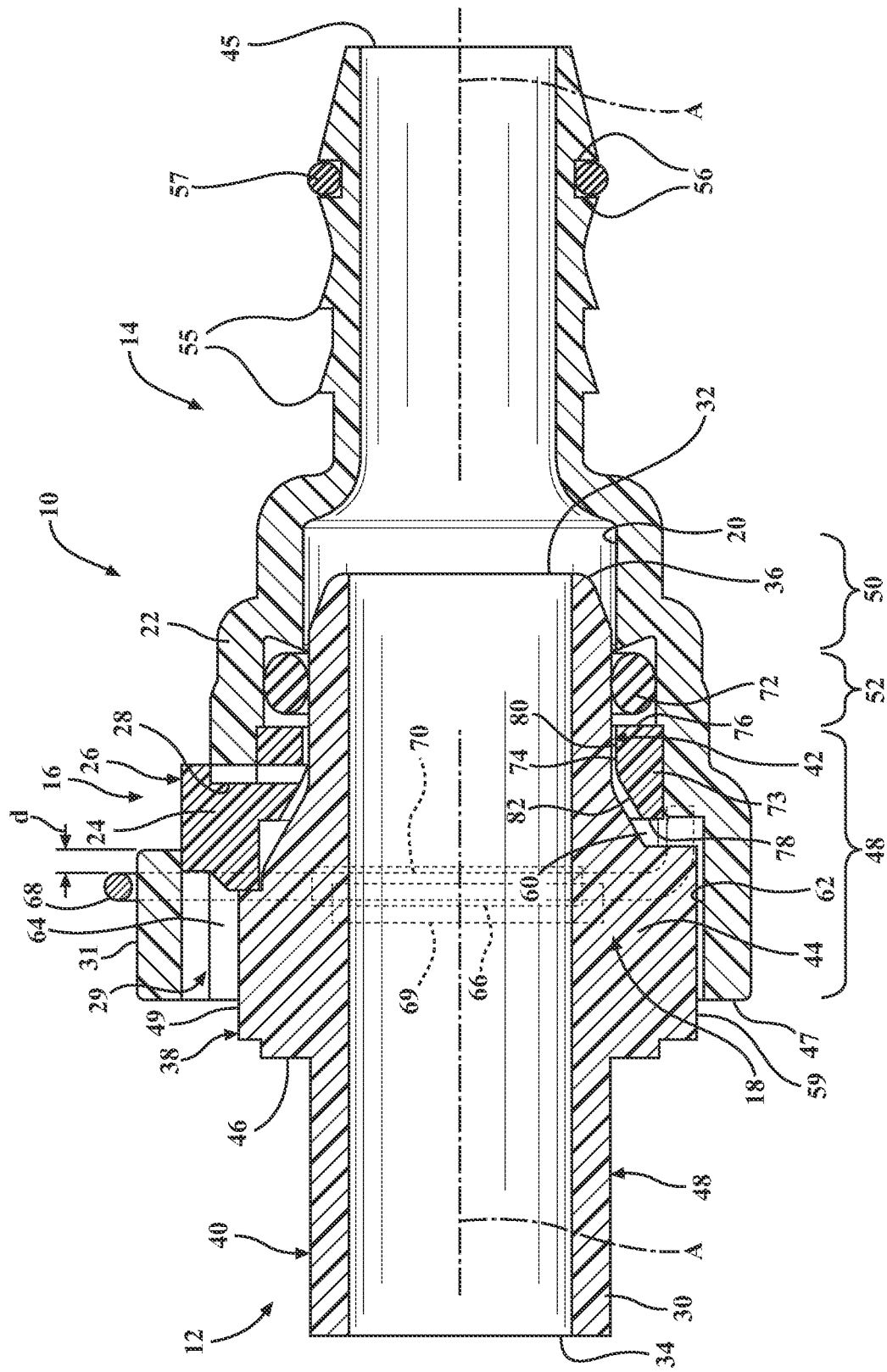
FIG. 2B is a view similar to FIG. 2A illustrating an intermediate stage of assembly of the quick connector assembly.
Figure 2C:
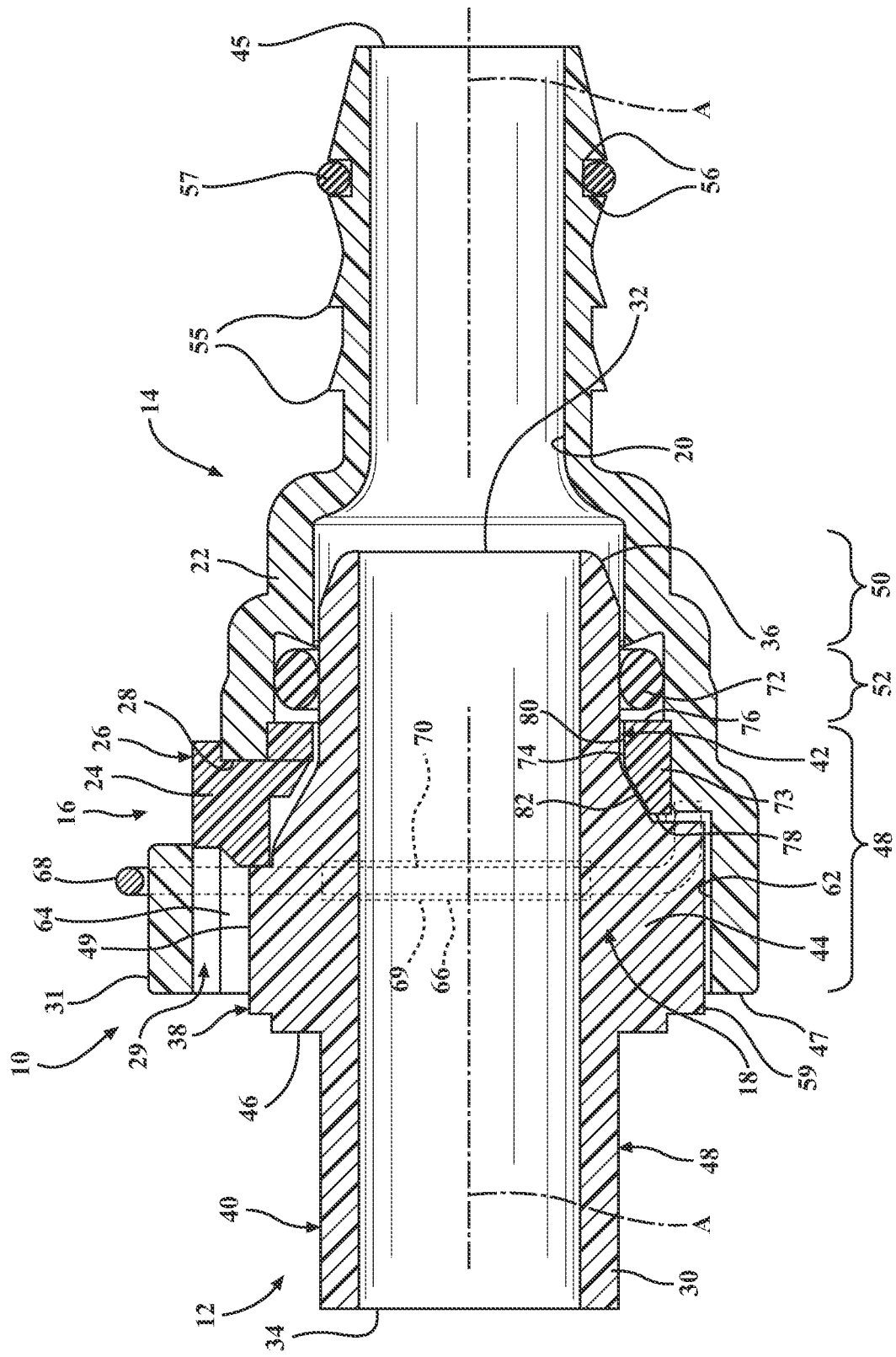
FIG. 2C is a cross-sectional view taken generally along the line 2C-2C of FIG. 1A.

During assembly, as shown in FIGS. 2A-2C, the retainer 16 is inserted axially along a central longitudinal axis, also referred to as central axis A, of the connector assembly 10, which corresponds to a longitudinal central axis of the individual male connector, housing, and retainer components 12, 14, 16, within an axially extending bore 18 bounded by an inner surface 20 of a tubular wall 22 of the housing 14. Upon inserting the retainer 16 into the housing bore 18, the male connector 12 is inserted generally along the central axis A into the bore 18 of the housing 14, whereupon an indicator body 24 of the retainer 16 is moved under a compressive force along the direction of the central axis A via be elastically compressed (FIG. 3A), also referred to as deflected, deformed or displaced, to bring an indicator surface 26 of the retainer 16 into a fully viewable, detectable position, referred to hereafter for simplicity reasons only, as "viewable position", outwardly from a covered first portion 28a of a channel 29 to an uncovered second portion 28b of the channel 29 of the housing 14 (FIG. 2C). the covered first portion 28a is enclosed by a shroud 31 of the housing 14, wherein the shroud 31 can be constructed as a monolithic piece of material with the housing 14, or formed as a separate piece and subsequently fixed to the housing 14. With the indicator surface 26 being in the viewable position, the male connector 12 is readily identifiable for indication as being in the fully coupled position. It is only when complete assembly has occurred between the male connector 12 and the housing 14 that a fluid-tight, gas-tight seal is assured of being perfected, and thus, being able to quickly identify complete assembly has been attained via the indicator surface 26 allows for economical, quick and reliable detection. Accordingly, during assembly, an efficient, reliable mechanism, utilizing a minimal number of components, is provided to visually, or otherwise view and detect that a proper and complete assembly has occurred between the male connector 12 and the housing 14, thereby avoiding any possibility of inadvertent leaks within the assembly 10 as a result of incomplete assembly. Of course, it is to be recognized that inspection of the indicator surface 26 may be manual, via direct, visual inspection by a person, or otherwise, wherein inspection may be automated via an automated electronic system, such as a camera, barcode, including a quick response (QR) code, reader system, by way of example and without limitation, in real-time.

Figure 1:
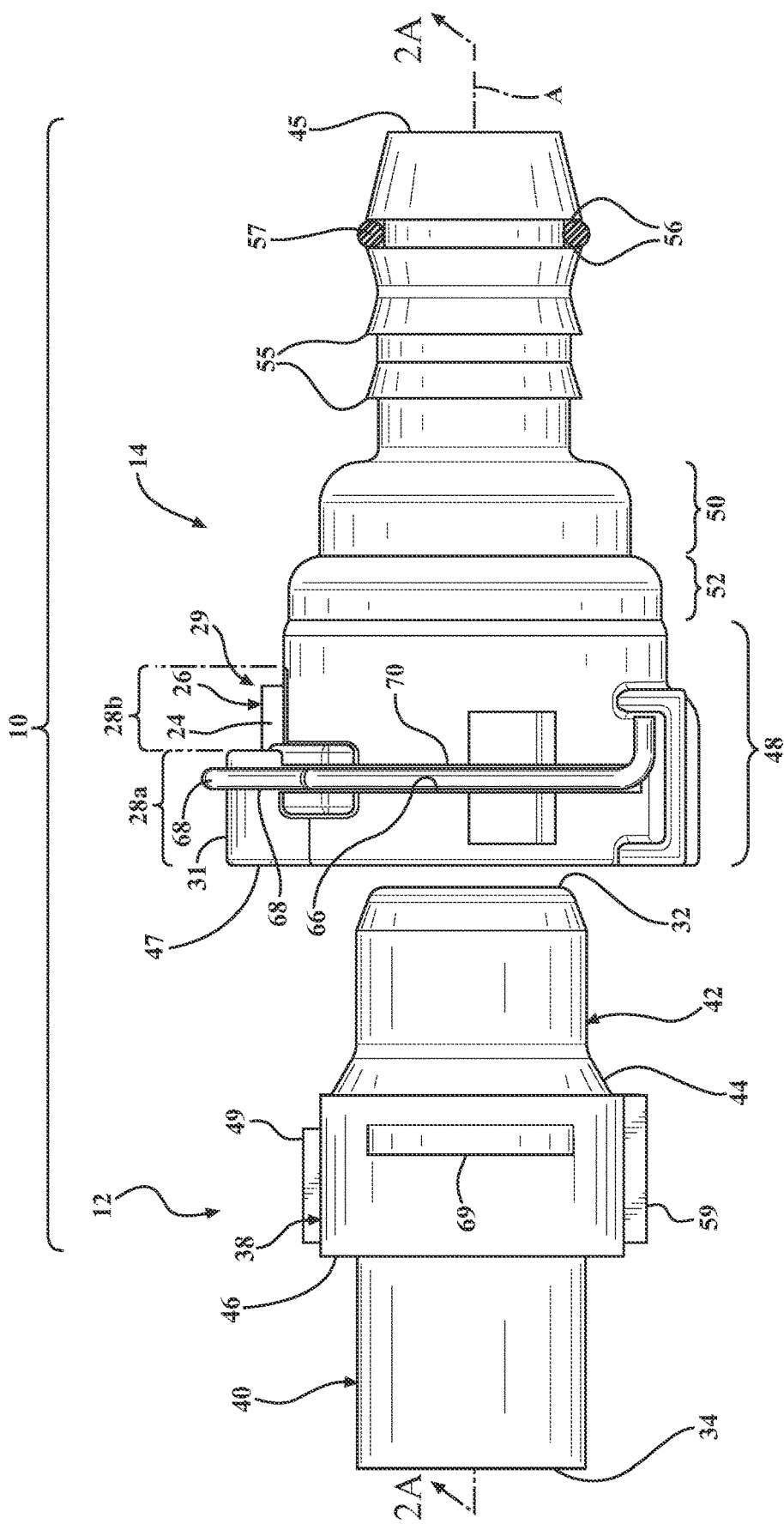
FIG. 1 is an exploded side elevation view of a quick connector assembly shown constructed in accordance with one aspect of the invention while in a decoupled state.
Figure 1A:
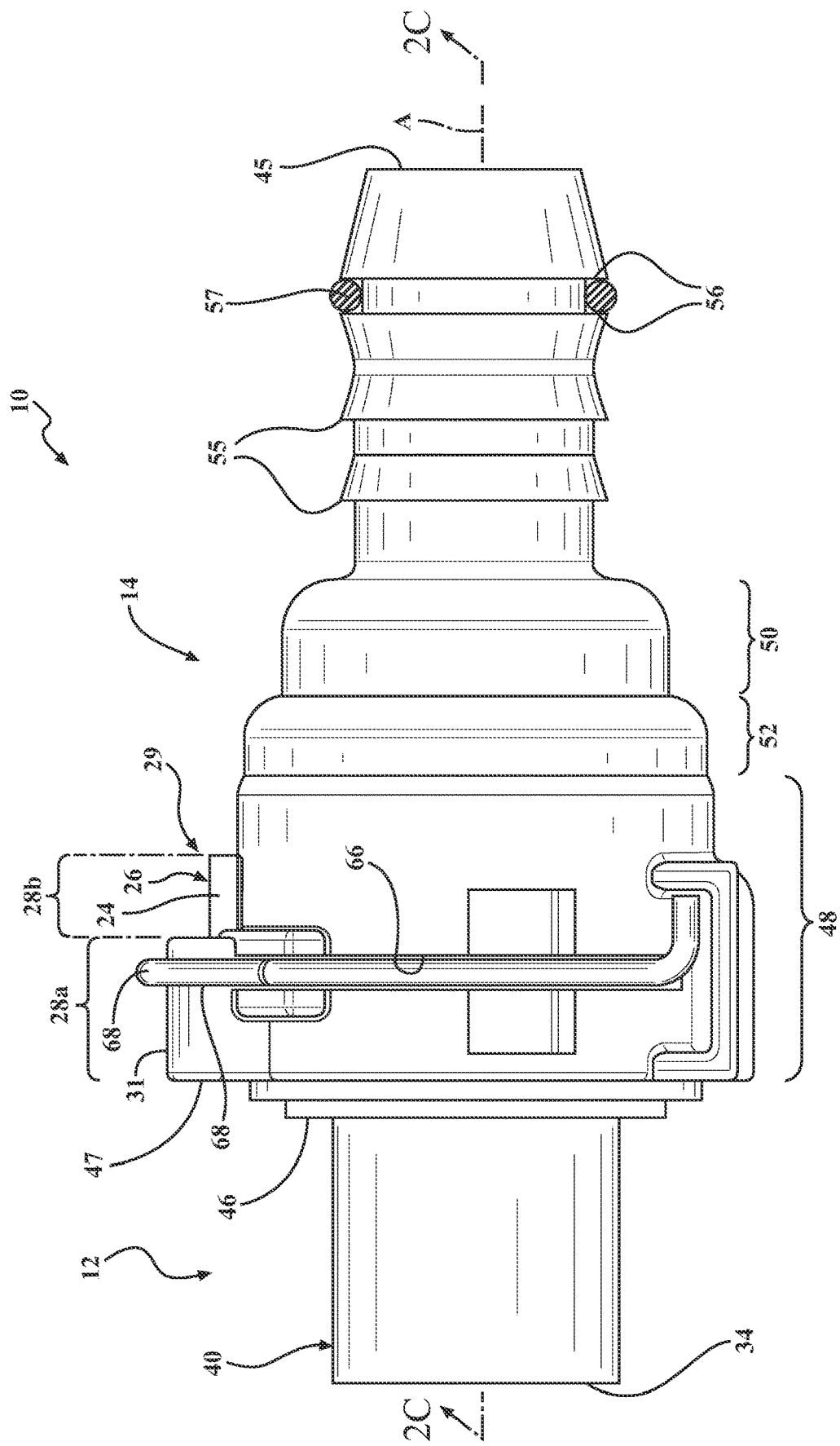
FIG. 1A is a view similar to FIG. 1 illustrating the quick connector assembly while in a coupled state.

The male connector 12 has a tubular connector wall 30 configured for insertion into the bore 18 of the housing 14 along the central axis A from a decoupled position, also referred to as disassembled state (FIGS. 1, 2A, and 2B), to a coupled position, also referred to as assembled state (FIGS. 1A and 2C). The connector wall 30 extends between opposite ends, with one end being an insertion end 32 and the opposite end being an attachment end 34 configured for operable attachment to a conduit (not shown). The insertion end 32 is shown as having a radiused lead-in surface in the form of a generally rounded nose 36 that generally tapers or reduces in diameter to the insertion end 32. The male connector 12 further includes an assembly feature in the form of an annular collar 38 between the opposite ends 32, 34. The annular collar 38 extends radially outwardly from an outer surface 40 of the tubular connector wall 30. The connector outer surface 40 has a connector cylindrical surface 42 extending from the insertion end 32 to a radially outwardly, conically tapered connector surface 44. The tapered connector surface 44 transitions to the annular collar 38. The annular collar 38 has an annular trailing shoulder 46 that transitions to the generally cylindrical outer surface that extends to the attachment end 34. A protrusion 49, such as a raised axially extending rib, extends radially outwardly from the connector outer surface 40. The protrusion 49 is shown as extending radially outwardly from an outer surface of the annular collar 38 of the tubular connector wall 30 for engagement with the indicator body 24 (FIGS. 2B, 2C, 3B, 3C). Upon engaging the indicator body 24, the protrusion 49 abuts and compresses the indicator body 24 to move a portion of the indicator surface 26 outwardly from the covered first portion 28a of the channel 29, such that the entirety of the indicator surface 26 is brought into view from outside the housing 14 via the uncovered second portion 28b of the channel 29. With the initially concealed portion of the indicator surface 26 being moved outwardly from the covered first portion 28a of the channel 29 into the uncovered second portion 28b of the channel 29, the indicator surface 26 is readily and entirely viewable outwardly from the housing 14, such that the indicator surface 26 is fully detectable to indicate the connector assembly 10 is in the fully connected, also referred to as coupled position, as discussed further hereafter. The male connector 12 has at least one alignment member 59 extending radially outwardly from the connector outer surface 40 for receipt in a corresponding alignment channel 62, wherein the alignment member 59 is shown, by way of example and without limitation, as being diametrically opposite the protrusion 49. The male connector 12, as described, is a male conduit member and may be constructed from any desired material, including plastics, metals, or otherwise, wherein the male connector 12 in one exemplary embodiment is a thermoplastic tube.

The housing 14, as best shown in FIGS. 2A-2C, includes coaxial, generally cylindrical portions forming at least a portion of the bore 18 that extends along the longitudinal central axis A from a first housing end 45 to a second housing end 47. The coaxial portions include a generally cylindrical enlarged diameter receiving portion, also referred to as upper diameter portion or first diameter portion 48, a generally cylindrical reduced diameter portion (reduced in diameter relative to the first diameter portion 48), also referred to as lower diameter portion or second diameter portion 50, with a generally cylindrical stepped intermediate diameter portion, also referred to as third diameter portion 52 extending between the first and second diameter portions 48, 50. An annular first shoulder, also referred to as upper shoulder 51 extends radially outwardly between the first diameter portion 48 and the second diameter portion 50, and is shown as extending radially outwardly from the third diameter portion 52 to the first diameter portion 48. An annular second shoulder, also referred to as lower shoulder 53, separates the second diameter portion 50 from the third diameter portion 52, and is shown extending radially outwardly from the second diameter portion 50 to the third diameter portion 52. As such, the relative diameters are such that the first diameter is greater than the second and third diameter, and the third diameter is greater than the second diameter: D1>D3>D2. A coupling portion 54, shown as having a plurality of consecutive annular coupling ridges 55 along its outer periphery for operable attachment to a conduit (not shown), a pair of seal ridges 56, and an O-ring 57 disposed between the seal ridges 56 to facilitate forming a fluid-tight seal. The enlarged first diameter portion 48 has an open end 58 and a generally cylindrical inner surface 60. A through passage 64 extends radially outwardly of the first diameter portion 48, and shown as extending from the second housing end 47 toward the first housing end 45 to the channel 29, such that through passage 64 interconnects the housing bore 18 to with the channel 29. The through passage 64 is sized for clearance, sliding receipt of the protrusion 49 and indicator body 24 therethrough, such that translation of the protrusion 49 with in the through passage 64 allows the protrusion 49 to engage and compress the indicator body 24 during insertion of the male connector 12 into the housing bore 18, whereupon the indicator surface 26 is moved in response to compression of the indicator body 24 for full detection in the uncovered portion 28b of the channel 29 upon the connector assembly 10 be fully assembled to the coupled position.

The housing 14 has a lock mechanism to facilitate releasable locked engagement with the male connector 12, such that the male connector 12, when moved to the fully inserted and fully coupled position, is releasably retained by the lock mechanism in the connected state. In accordance with one non-limiting aspect of the disclosure, the lock mechanism can be provided including at least one or a pair of lock slots 66 extending though through the tubular housing wall 22 in diametrically opposite relation with one another, wherein the lock slot(s) 66 are sized for snapping, spring biased receipt of a lock member 68 therethrough to engage the male connector 12 and releasably retain the male connector 12 in the connected state. The lock member 68 extends through the lock slot(s) 66 into the bore 18 for engagement with a corresponding lock feature, such as corresponding shoulder(s) or notch(es) 69 extending into the male connector 12 to releasably maintain the male connector 12 in the coupled position. In the non-limiting embodiment illustrated, the lock member 68 is provided as a metal spring clip, generally U or C-shaped, with the spring clip 68 extending circumferentially about a portion of the housing 14, with opposite legs 70 of the spring clip 68 extending under a spring bias through the lock slots 66 and into the bore 18, shown as extending into locking engagement with notch(es) 69 of the male connector 12.

The intermediate diameter portion 52 is sized diametrically and axially to receive at least one elastomeric annular seal member, and shown as an elastomeric O-ring 72. The O-ring 72 is shown as being seated against the lower shoulder 53 with the retainer 16 retaining the O-ring in place. Accordingly, the O-ring 72 is confined within the intermediate diameter portion 52 between the lower shoulder 53 and the retainer 16, with the O-ring 72 forming a fluid/gas tight seal against and between the housing inner surface 20 and the connector cylindrical surface 42. It should be recognized the seal member 72 could be configured other than as described and shown, as long a fluid-tight seal is formed thereby against the connector cylindrical surface 42 of the male connector 12 upon assembly and while in use.

Figure 3A:
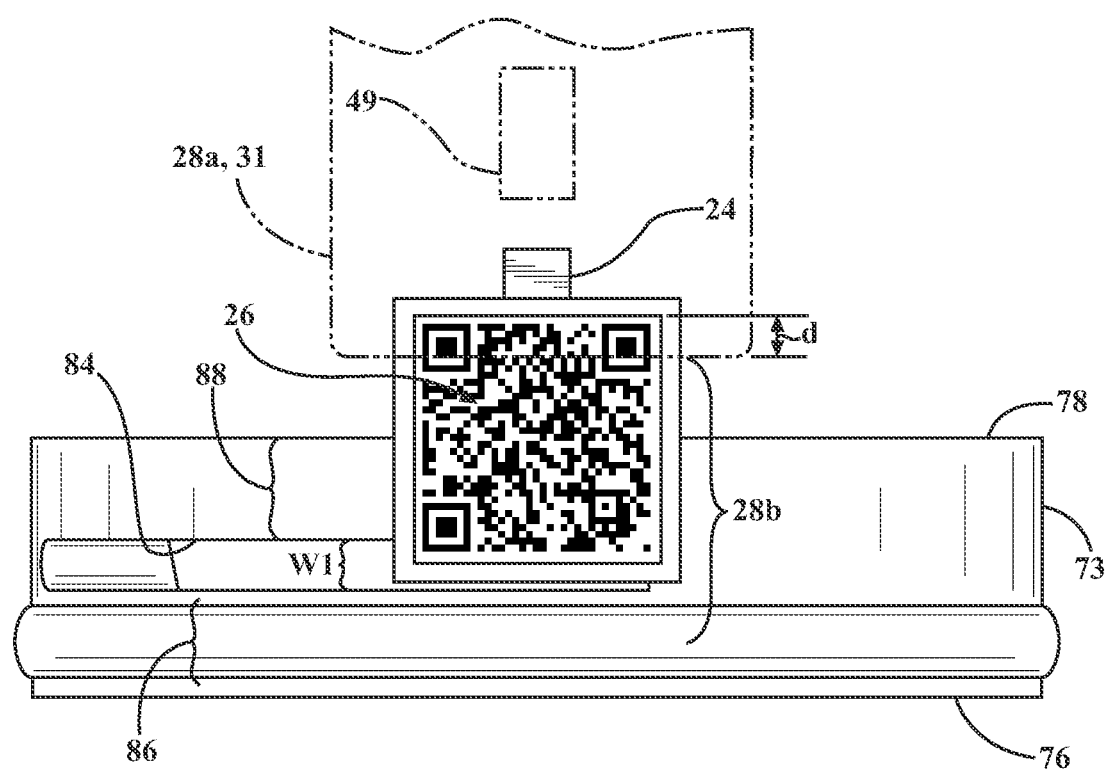
FIG. 3A is a plan view of a retainer of the quick connector assembly corresponding to FIG. 2A, illustrating the retainer while in an uncompressed state while the quick connector assembly is in the decoupled state.
Figure 3B:
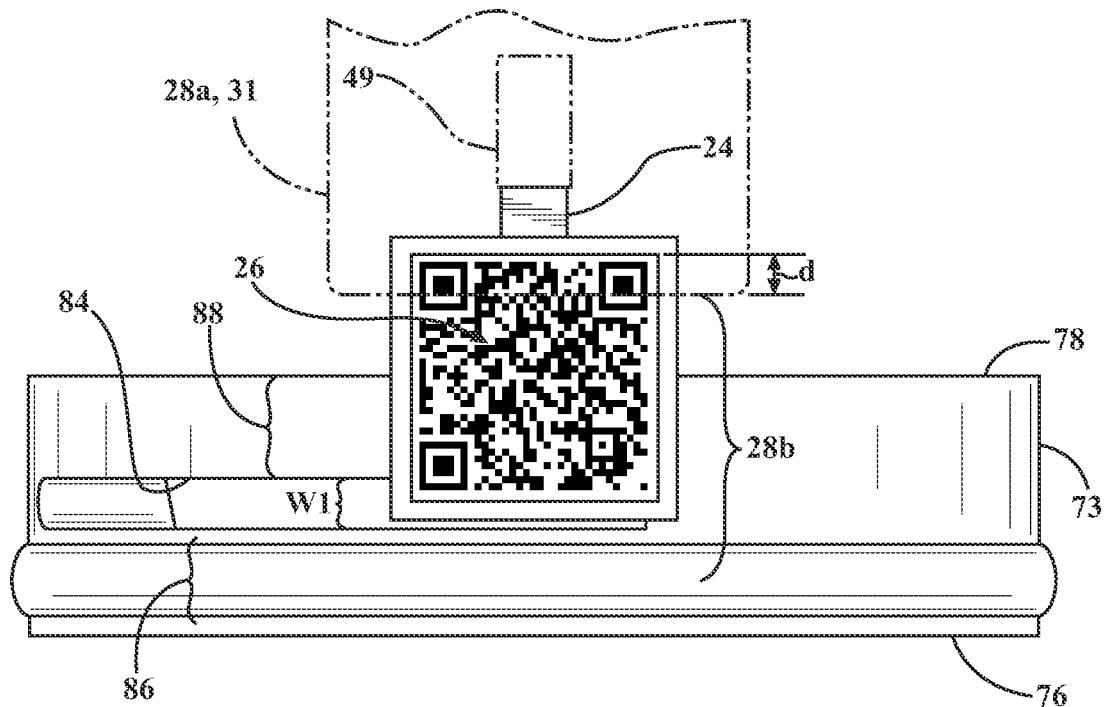
FIG. 3B is a plan view of a retainer of the quick connector assembly corresponding to FIG. 2B, illustrating the retainer while in an uncompressed state while the quick connector assembly is in the decoupled state.
Figure 3C:
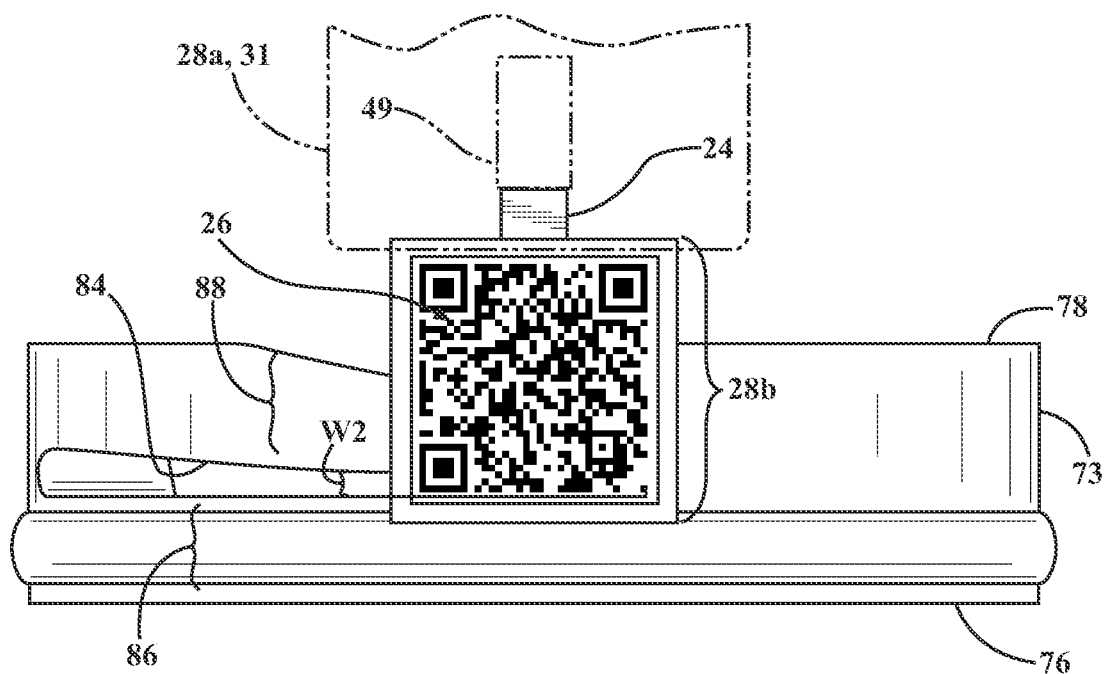
FIG. 3C is a plan view of a retainer of the quick connector assembly corresponding to FIG. 2C, illustrating the retainer while in a compressed state while the quick connector assembly is in the coupled state.
Figure 4:
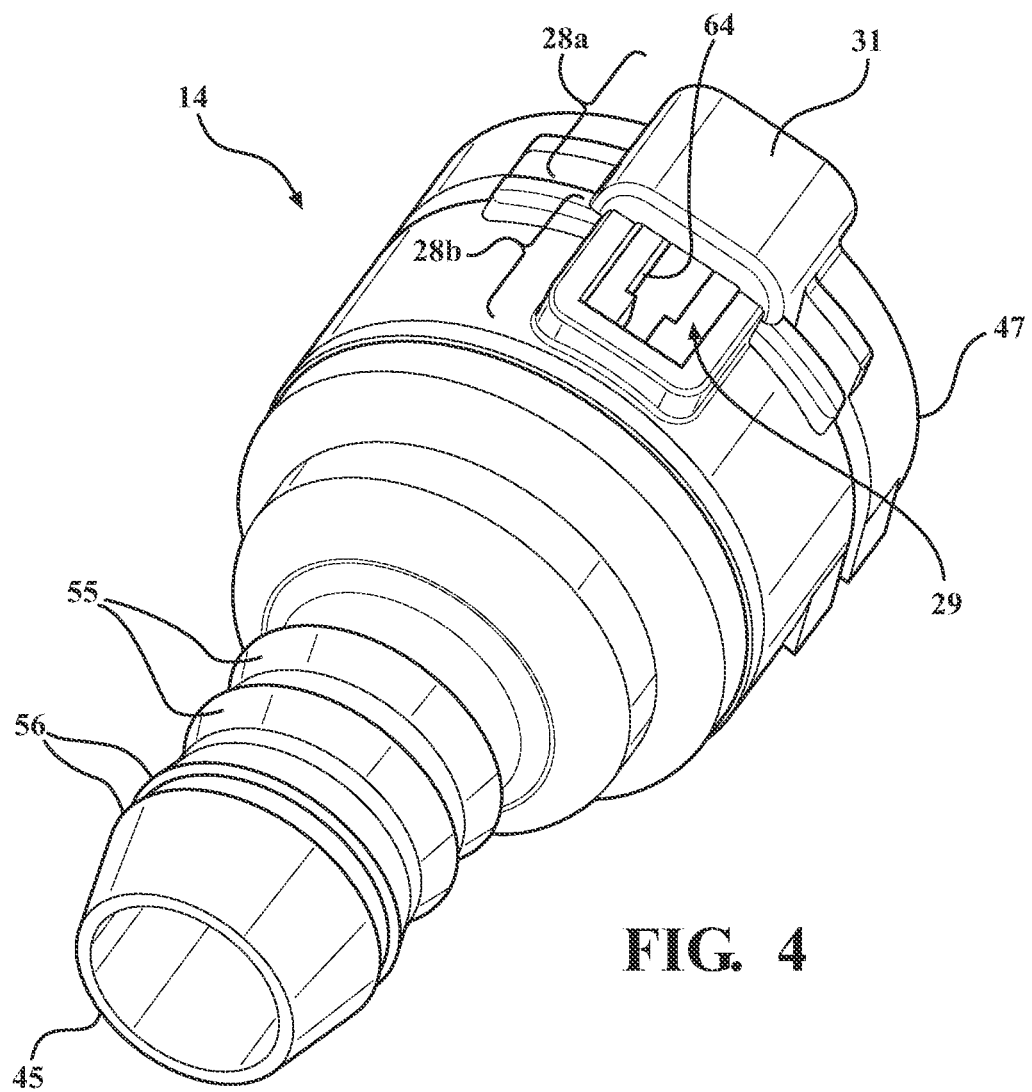
FIG. 4 is a perspective view of a housing of the quick connector assembly.
Figure 5:
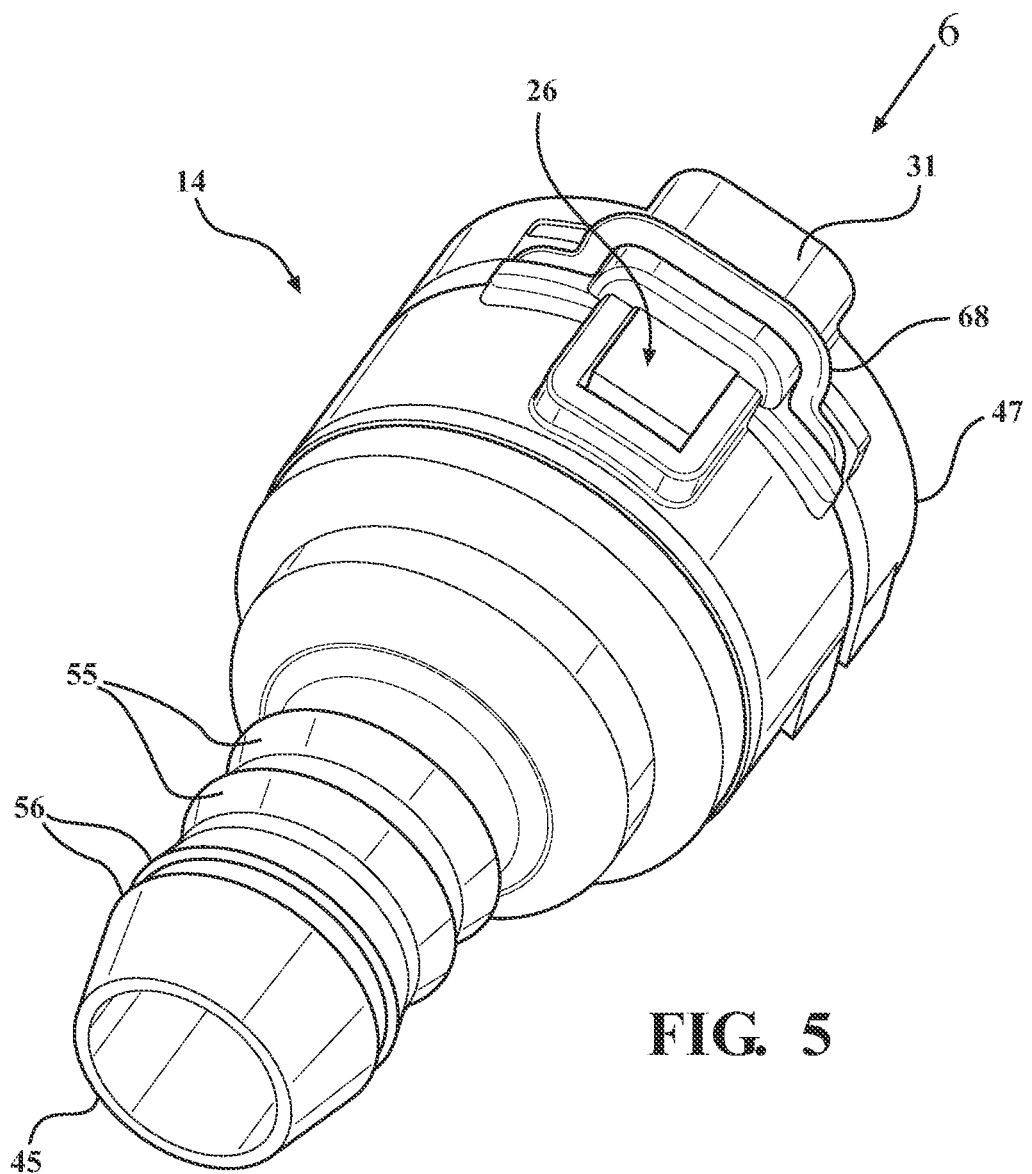
FIG. 5 is a view similar to FIG. 4 with a lock member and a retainer assembled with the housing.
Figure 6:
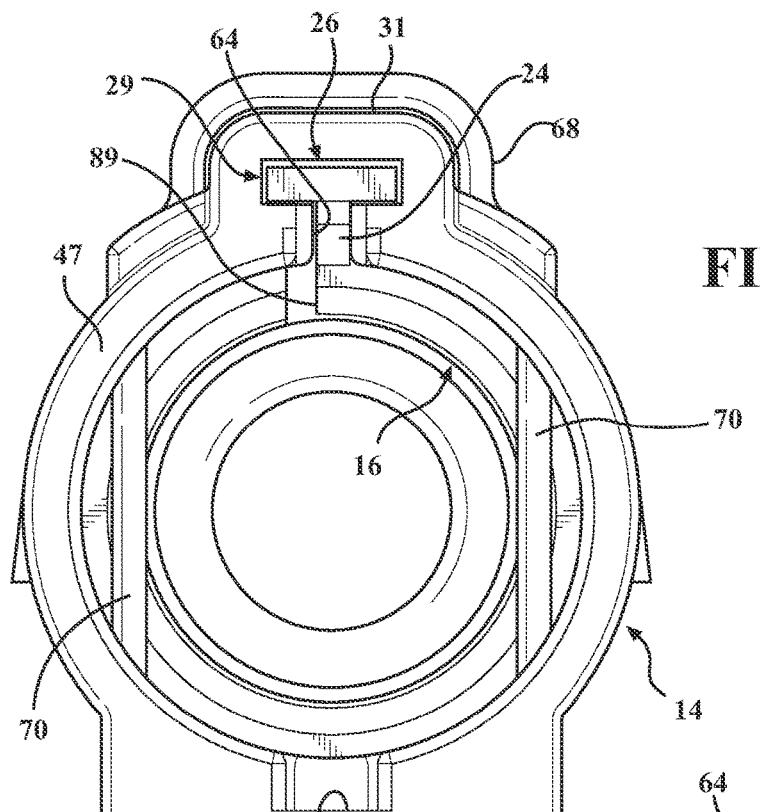
FIG. 6 is an end view of the housing looking generally along the direction of arrow 6 of FIG. 5.
Figure 7:
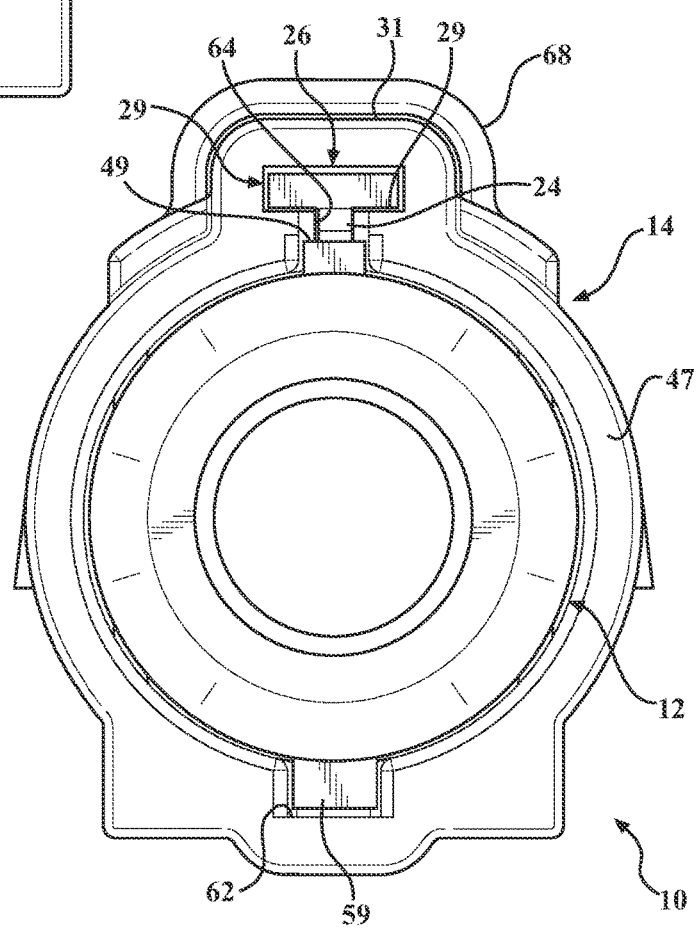
FIG. 7 is a view similar to FIG. 6 illustrating a male connector coupled with the housing.

The retainer 16 has an annular retainer wall 73 formed of an elastomeric, polymeric material, such as rubber, by way of example and without limitation. The annular wall 73 is sized for receipt in the housing bore 18. The indicator body 24 extends radially outwardly from the annular retainer wall 73 to the indicator surface 26. The indicator body 24, as noted above, is sized for sliding receipt in the through passage 64 of the housing 14. The annular retainer wall 73 has a retainer inner surface 74 that extends axially along the central axis A between a first retainer end 76 and an opposite second retainer end 78. The first retainer end 76 abuts the annular second shoulder 51 to obstruct and prevent axial movement of the retainer 16 along the central axis A when the protrusion 49 forcibly compresses the indicator body 24 during assembly, as discussed further below. To facilitate desired axial movement of the indicator surface 26 into full view via the opening 28, the annular wall 73 has an axially compressible region, preferably provided as a weakened region that is more easily axially compressed relative to a remaining portion of the annular wall 73. The weakened region is shown in FIGS. 3A-3C, by way of example and without limitation, as being provided by a slot 84, though it is contemplated herein that any suitable mechanism could be used to provide the weakened region, including a recess, for example. The slot 84 extends along a circumferential direction through the annular retainer wall 73 between the first retainer end 76 and the second retainer end 78. The slot 84 forms a first sector 86 extending from the slot 84 to the first retainer end 76 and a second sector 88 extending from the slot 84 to the second retainer end 78, wherein the indicator body 24 extends radially outward from the second sector 88 adjacent a cantilevered free end 89 (FIG. 6) of the second sector 88. The slot 84 has a first width (W1) extending between the first sector 86 and the second sector 88 when the male connector 12 is in the decoupled position, and the slot 84 is compressed to a second width (W2) extending between the first sector 86 and the second sector 88 when the male connector 12 is in the coupled position, with the second width W2 being less than the first width W1. The indicator surface 26 extends into the covered first portion 28a of the channel 29 a first distance (d), out from full detection within the uncovered second portion 28b of the channel 29, when the male connector 12 is in the decoupled position, with the first distance (d) being substantially equal to the first width W1 of the slot 84, by way of example and without limitation. Accordingly, the slot 84 is closed or substantially closed when the male connector 12 is moved to the coupled position, whereat the indicator surface 26 is translated outwardly from the covered first portion 28a of the channel 29 into the uncovered second portion 28b of the channel 29, whereat the indicator surface 26 becomes fully detectable via any desired viewing/detecting mechanism, whether manual or automated.

The retainer inner surface 74 has a generally cylindrical portion 80 extending from the first retainer end 76 toward the second retainer end 78 to a tapered portion 82 diverging radially outwardly from the generally cylindrical portion 78. The tapered connector surface 44 of the male connector 12 is configured to abut the tapered portion 82 of the retainer 16 when the male connector 12 is in moved axially along the central axis A into the coupled position.

In assembly, as best shown in FIGS. 2A-2C, in accordance with a method of making and ensuring a reliable, fluid-tight connection between components of the connector assembly 10 for coupling fluid conduits to one another in a leak proof connection, with the O-ring 72 and disposed in the intermediate diameter portion 52, the retainer 16 is disposed axially into the receiving first diameter portion 48 of the housing 14 along the longitudinal central axis A. As the retainer 16 is inserted, the retainer indicator body 24 is disposed within the through passage 64 and indicator surface 26 is received and slid through the channel 64 until the first retainer end 76 is brought into engagement with the upper shoulder 51, whereupon the O-ring 72 is contained within the intermediate diameter portion 50. Then, with the retainer 16 seated against the upper shoulder 51, the male connector 12 is disposed axially along the axis A into the housing 14. The insertion end 32 of the male connector 12 is inserted through the retainer 16, through the O-ring 72, and into the second diameter portion 50 of the housing 14, whereupon the cylindrical connector surface 42 is brought into sealed engagement with the annular seal 72.

As the male connector 12 is being disposed into the housing bore 18 along the central axis A, the protrusion 49 is brought into engagement with the indicator body 24 of the retainer 16. As the male connector 12 continues to be inserted along the central axis A, the protrusion 49 increasingly compresses the elastically deformable indicator body 24 and causes the weakened region to be axially compressed, such that the second sector 88 is compressed axially toward the first sector 86, thereby causing the slot 84 forming the weakened region to be axially compressed and reduced in width from the first width W1 to the second width W2. As the indicator body 24 is elastically compressed, a portion of the indicator surface 26, which is originally concealed within the covered first portion 28a of the channel 29 while the male connector 12 is in the decoupled position, is caused to move axially outwardly from the covered first portion 28a of the channel 29 into the uncovered second portion 28b of the channel 29. As such, upon the male connector 12 reaching the coupled position, the entirety of the indicator surface 26 becomes viewable in the uncovered second portion 28b of the channel 29. Accordingly, detection of the entire indicator surface 26 is made possible, whether via manual detection or automated detection, such as via a bar code or QR code scanner reading an associated bar code or QR code on the fully viewable indicator surface 26, to detect that the male connector 12 is in the coupled position. It is to be understood that upon the male connector 12 reaching the coupled position, that the lock member 68, supported by the housing 14, can be configured to be brought into releasably locked engagement with the notch(es) 69 of male connector 12 to retain the male connector in the coupled position.

In accordance with a further aspect of the disclosure, the method can further include bringing the protrusion 49 into engagement with the indicator body 24 and causing the weakened portion, provided by the slot 84, by way of example and without limitation, to be at least partially compressed toward the second width W2, whereupon the indicator body 24 and the indicator surface 26 are caused to move axially in concurrent relation with one another until the indicator surface 26 is moved in its entirety outwardly from covered first portion 28a of the channel 29 and into full view from outside the housing 14 via the uncovered second portion 28b of the channel 29. Then, after at least partially compressing the width of the slot 84, the method further includes bringing the tapered connector surface 44 into sealed engagement with the tapered portion 82 of the retainer inner surface 74 when the male connector 12 is in brought to the coupled position. It is to be understood that with the tapered connector surface 44 remaining out from sealed engagement with the tapered portion 82 until the indicator surface 26 has moved in its entirety outwardly from the covered first portion 28a of the channel 29 and into full view through via the uncovered second portion 28b, assembly is made easier via less axial resistance, such that assurance is provided that the indicator surface 26 is free to move in unobstructed fashion to its fully viewable position within the uncovered portion 28a of the channel 29.

It is to be recognized that intentional disassembly of the male connector 12 from the housing 14 is provided via removing the lock member 68, whereupon the male connector 12 can be freely pulled axially outwardly from the housing bore 18. Upon removal of the male connector 12 from the housing bore 18, the compressed, weakened region of the retainer 73 automatically returns to its unbiased, uncompressed state, such that the weakened region, provided by slot 84, by way of example, returns from the compressed width W2 to the uncompressed width W1. Thereafter, the male connector 12 can be reassembled to the housing 14, as discussed above, thereby causing the weakened region of the retainer 73 to again become compressed to the reduced width W2.

Accordingly, the retainer 73 is able to be used repeatedly upon connecting, disconnecting, and reconnecting the male connector 12 to the housing 14, as desired.

The foregoing description of the embodiments has been provided for purposes of illustration and description. It is not intended to be exhaustive or to limit the disclosure or claims. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure and claims, wherein the claims ultimately define the scope of the invention.

What is claimed is:

1. A connector assembly for establishing a fluid-tight connection between fluid conduits, said connector assembly, comprising:
    a housing having a tubular housing wall with a housing inner surface bounding a housing bore extending along a central longitudinal axis between a first housing end and an opposite second housing end, said housing having a channel extending axially from said second housing end toward said first housing end, wherein the channel has a covered first portion enclosed by a shroud adjacent the second housing end and an uncovered second portion extending from the covered first portion toward the first housing end;
    a retainer having an annular retainer wall sized for receipt in said housing bore, an indicator body extending radially outwardly from said annular retainer wall to an indicator surface, said indicator body being sized for translation in said channel;
    a male connector having a tubular connector wall configured for insertion into said bore of said housing along said central axis from a decoupled position to a coupled position, a protrusion extending radially outwardly from a connector outer surface of said tubular connector wall for engagement with said indicator body,
    wherein said indicator surface remains partially concealed by said shroud within said covered first portion of said channel when said male connector is in said decoupled position, thereby not being fully viewable in said uncovered second portion of said channel and indicating the male connector is in said decoupled position, and wherein said protrusion engages and compresses said indicator body when said male connector is in said coupled position, whereupon said indicator surface is moved axially outwardly from said covered first portion of said channel such that said indicator surface is fully viewable in said uncovered second portion of said channel, thereby indicating the male connector is in the coupled position;
    wherein a through passage extends radially outwardly from said housing bore to said channel, said protrusion being configured for sliding receipt in said through passage for engagement with said indicator body; and
    wherein said housing inner surface has an alignment channel extending axially from said second housing end toward said housing second end, said male connector having an alignment member extending radially outwardly from the connector outer surface for receipt in said alignment channel.

2. The connector assembly of claim 1, wherein said housing inner surface has a first diameter portion and a second diameter portion with an annular lower shoulder extending between said first diameter portion and said second diameter portion, an annular seal is disposed between said retainer and said annular lower shoulder, wherein said retainer retains said seal between said first diameter portion and said annular lower shoulder.

3. The connector assembly of claim 2, wherein said housing inner surface has an intermediate diameter portion between said first diameter portion and said second diameter portion with an annular upper shoulder extending radially outwardly from said intermediate diameter portion to said first diameter portion, said retainer being received in said first diameter portion and retaining said seal in said intermediate diameter portion.

4. The connector assembly of claim 3, wherein said annular retainer wall has a retainer inner surface extending axially along said central axis between a first retainer end and an opposite second retainer end, said first retainer end abutting said annular upper shoulder to prevent movement of said retainer along said central axis when said protrusion compresses said indicator body.

5. The connector assembly of claim 4, wherein said retainer inner surface has a generally cylindrical portion extending from said first retainer end toward said second retainer end to a tapered portion diverging radially outwardly from said generally cylindrical portion, said connector outer surface has a tapered connector surface configured to abut said tapered portion when said male connector is in said coupled position.

6. The connector assembly of claim 1, wherein said alignment member is diametrically opposite said protrusion.

7. The connector assembly of claim 1, wherein said annular retainer wall extends axially along said central axis between a first retainer end and an opposite second retainer end, wherein a slot extends circumferentially through said annular retainer wall between said first retainer end and said second retainer end to form a first sector extending from said slot to said first retainer end and a second sector extending from said slot to said second retainer end, said indicator body extending radially outward from said second sector.

8. The connector assembly of claim 7, wherein said slot has a first width extending between said first sector and said second sector when said male connector is in said decoupled position, and said slot has a second width extending between said first sector and said second sector when said male connector is in said coupled position, said second width being less than said first width.

9. The connector assembly of claim 8, wherein said indicator surface extends into said covered first portion of said channel a first distance when said male connector is in said decoupled position, said first distance being substantially equal to said first width of said slot.

10. The connector assembly of claim 1, wherein said annular retainer wall is formed of an elastomeric, polymeric material.

11. The connector assembly of claim 1, further including a lock member supported by said housing, said lock member being configured to releasably maintain said male connector in said coupled position.

12. The connector assembly of claim 11, wherein said housing has a lock slot extending though through said tubular housing wall, wherein said lock member extends through said lock slot into said bore for engagement with said male connector to releasably maintain said male connector in said coupled position.

13. A method of making and ensuring a reliable, fluid-tight connection between components of a connector assembly for coupling fluid conduits, comprising:
providing a housing having a tubular housing wall with an housing inner surface bounding a housing bore extending along a central longitudinal axis between a first housing end configured for attachment to one of the fluid conduits and an opposite second housing end, said housing having a channel extending axially from said second housing end toward said first housing end, wherein the channel has a covered first portion enclosed by a shroud adjacent the second housing end and an uncovered second portion extending from the covered first portion toward the first housing end;
disposing a retainer having an annular retainer wall in said housing bore, with an indicator body extending radially outwardly from said annular retainer wall to an indicator surface, whereupon at least a portion of said indicator surface is concealed by said shroud within said covered first portion of said channel;
providing a male connector having a tubular connector wall with a protrusion extending radially outwardly from a connector outer surface of said tubular connector wall;
inserting the male connector into the housing bore along the central axis and bringing the protrusion into engagement with the indicator body, and continuing to insert the male connector along the central axis until the male connector reaches a coupled position with said housing, whereat said protrusion is in compressing engagement with said indicator body to cause the portion of said indicator surface concealed with said covered first portion of said channel to move axially outwardly from said covered first portion of said channel into said uncovered second portion of said channel, such that the entirety of said indicator surface is viewable in said uncovered second portion of said channel, thereby providing a detectable indication that the male connector is in the coupled position; and
further including providing said annular retainer wall extending axially along said central axis between a first retainer end and an opposite second retainer end, with a weakened region extending between said first retainer end and said second retainer end, with the indicator body extending radially outward from said weakened region, wherein said weakened region has a first width when said male connector is in a decoupled position, and causing said weakened region to be compressed to a second width when said male connector is inserted to said coupled position, with said second width being less than said first width.

14. The method of claim 13, further including bringing a lock member, supported by said housing, into releasably locked engagement with said male connector when said male connector reaches said coupled position.

15. The method of claim 13, further including providing said retainer inner surface having a generally cylindrical portion extending from said first retainer end toward said second retainer end to a tapered portion diverging radially outwardly from said generally cylindrical portion, and providing said connector outer surface having a cylindrical connector surface extending to a tapered connector surface, and bringing said protrusion into engagement with the indicator body and causing said weakened region to be at least partially compressed toward said second width, and then after at least partially compressing the weakened region, bringing said tapered connector surface into sealed engagement with said tapered portion of said retainer inner surface when said male connector is in said coupled position.

16. The method of claim 15, further including providing an annular seal between said retainer and said annular first shoulder, and bringing said cylindrical connector surface into sealed engagement with said annular seal.

17. A connector assembly for establishing a fluid-tight connection between fluid conduits, said connector assembly, comprising:
a housing having a tubular housing wall with a housing inner surface bounding a housing bore extending along a central longitudinal axis between a first housing end and an opposite second housing end, said housing having a channel extending axially from said second housing end toward said first housing end, wherein the channel has a covered first portion enclosed by a shroud adjacent the second housing end and an uncovered second portion extending from the covered first portion toward the first housing end;
a retainer having an annular retainer wall sized for receipt in said housing bore, an indicator body extending radially outwardly from said annular retainer wall to an indicator surface, said indicator body being sized for translation in said channel; and
a male connector having a tubular connector wall configured for insertion into said bore of said housing along said central axis from a decoupled position to a coupled position, a protrusion extending radially outwardly from a connector outer surface of said tubular connector wall for engagement with said indicator body,
wherein said indicator surface remains partially concealed by said shroud within said covered first portion of said channel when said male connector is in said decoupled position, thereby not being fully viewable in said uncovered second portion of said channel and indicating the male connector is in said decoupled position, and wherein said protrusion engages and compresses said indicator body when said male connector is in said coupled position, whereupon said indicator surface is moved axially outwardly from said covered first portion of said channel such that said indicator surface is fully viewable in said uncovered second portion of said channel, thereby indicating the male connector is in the coupled position, wherein said annular retainer wall extends axially along said central axis between a first retainer end and an opposite second retainer end, wherein a slot extends circumferentially through said annular retainer wall between said first retainer end and said second retainer end to form a first sector extending from said slot to said first retainer end and a second sector extending from said slot to said second retainer end, said indicator body extending radially outward from said second sector.

18. The connector assembly of claim 17, wherein said slot has a first width extending between said first sector and said second sector when said male connector is in said decoupled position, and said slot has a second width extending between said first sector and said second sector when said male connector is in said coupled position, said second width being less than said first width.

19. The connector assembly of claim 18, wherein said indicator surface extends into said covered first portion of said channel a first distance when said male connector is in said decoupled position, said first distance being substantially equal to said first width of said slot.

20. The connector assembly of claim 17, further including a lock member supported by said housing, said lock member being configured to releasably maintain said male connector in said coupled position.

\* \* \* \* \*